US012731752B2

(12) United States Patent
Nishino

(10) Patent No.: US 12,731,752 B2
(45) Date of Patent: Sep. 8, 2026

(54) X-RAY GENERATOR

(71) Applicant: HAMAMATSU PHOTONICS K.K., Hamamatsu (JP)

(72) Inventor: Daiki Nishino, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 169 days.

(21) Appl. No.: 18/818,856

(22) Filed: Aug. 29, 2024

(65) Prior Publication Data

US 2025/0112015 A1 Apr. 3, 2025

(30) Foreign Application Priority Data

Oct. 3, 2023 (JP) ................................ 2023-172260

(51) Int. Cl.

*H01J 35/30* (2006.01)
*H01J 35/14* (2006.01)
*H05G 1/10* (2006.01)
*H05G 1/32* (2006.01)
*H05G 1/34* (2006.01)

(52) U.S. Cl.

CPC ............ *H01J 35/30* (2013.01); *H01J 35/153* (2019.05); *H05G 1/10* (2013.01); *H05G 1/32* (2013.01); *H05G 1/34* (2013.01)

(58) Field of Classification Search

CPC ........ H01J 35/30; H01J 35/153; H01J 35/147; H05G 1/10; H05G 1/32; H05G 1/34; H05G 1/52

See application file for complete search history.

(56) References Cited

U.S. PATENT DOCUMENTS 3,660,712 A * 5/1972 Mancebo ................ H01J 19/34 313/313
3,665,236 A * 5/1972 Gaines .................... H01J 21/02 313/313

FOREIGN PATENT DOCUMENTS

JP H08-94546 A 4/1996
JP 4429811 B2 3/2010
JP 4434943 B2 3/2010
JP 4860202 B2 1/2012
JP 2014-130732 A 7/2014
WO WO-03/103346 A1 12/2003
WO WO-2018225307 A1 * 12/2018 ............... H05G 1/32

* cited by examiner

*Primary Examiner* — Kiho Kim
(74) *Attorney, Agent, or Firm* — Faegre Drinker Biddle & Reath LLP

(57) ABSTRACT

An X-ray generator includes: a cathode electrode configured to emit electrons; an adjustment electrode configured to adjust an amount of electrons emitted from the cathode electrode; a control electrode configured to control a trajectory of the electrons from the cathode electrode; a target configured to generate an X-ray by incidence of the electrons; a discharge detection unit configured to detect discharge between the cathode electrode and the adjustment electrode; and a deflection switching unit configured to switch a deflection state of the electrons E directed toward the target such that a focal position of the electrons on the target during discharge detection deviates from the focal position of the electrons E on the target during normal operation.

7 Claims, 5 Drawing Sheets

X-RAY GENERATOR

TECHNICAL FIELD

The present disclosure relates to an X-ray generator.

BACKGROUND

As a conventional X-ray generator, for example, there is a radiation generation unit described in Japanese Unexamined Patent Publication No. 2014-130732. This conventional radiation generation unit includes a cathode electrode heated by a heater, an extraction electrode that extracts electrons from the heated cathode electrode, a heater power supply connected to the heater, an electrode power supply connected to the extraction electrode, and a target that receives electrons from the cathode electrode and generates radiation.

In the X-ray generator as described above, discharge generated by various factors is a problem. For example, the X-ray generator described in Japanese Unexamined Patent Publication No. H8-94546 focuses on the discharge generated in a casing. When the discharge occurs in the casing, a voltage (tube voltage) applied between the cathode electrode and the target instantaneously decreases. At this time, when a bias voltage applied from Wehnelt is kept at a constant value, a focal area of X-ray formed on the target is excessively reduced, and the target is damaged. The X-ray generator of Japanese Unexamined Patent Publication No. H8-94546 includes means for detecting discharge generated in the casing, and controls the bias voltage applied from the Wehnelt so that a focal point of the X-ray is not smaller than an allowable limit when the discharge is detected.

SUMMARY

The discharge in the X-ray tube can also occur at a further specific location in the casing. For example, when an adjustment electrode for adjusting an amount of electrons emitted from the cathode electrode is disposed in the X-ray tube, for example, it is conceivable that a part of a material constituting the cathode electrode flies from the cathode electrode heated by the heater and adheres to the adjustment electrode. When a deposit is deposited on the adjustment electrode, a distance between the cathode electrode and the adjustment electrode is shortened, and inherent withstand voltage characteristics are deteriorated, and discharge is likely to occur. When the discharge occurs between the cathode electrode and the adjustment electrode, since the cathode electrode and the adjustment electrode have the same potential during the discharge, control of the amount of electrons emitted from the cathode electrode, which has been performed by a potential difference between the cathode electrode and the adjustment electrode, cannot be temporarily performed. In this case, since the electrons from the cathode electrode are emitted without control according to a potential difference between the cathode electrode and the target, excessive electron emission may occur from the cathode electrode. When excessive electron emission is performed from the cathode electrode, excessive electrons are incident on the target, and the target may be damaged.

The present disclosure has been made to solve the above problems, and an object of the present disclosure is to provide an X-ray generator capable of continuing appropriate generation of X-ray even when the discharge occurs between the cathode electrode and the adjustment electrode.

An X-ray generator according to one aspect of the present disclosure includes: a cathode electrode configured to emit electrons; an adjustment electrode configured to adjust an amount of electrons emitted from the cathode electrode; a control electrode configured to control a trajectory of the electrons from the cathode electrode; a target configured to generate an X-ray by incidence of the electrons; a discharge detection unit configured to detect discharge between the cathode electrode and the adjustment electrode; and a deflection switching unit configured to switch a deflection state of the electrons directed toward the target such that a focal position of the electrons on the target during discharge detection deviates from the focal position of the electrons on the target during normal operation.

In the X-ray generator, when the discharge between the cathode electrode and the adjustment electrode is detected, the deflection state of the electrons directed toward the target is switched to control the trajectory of the electrons so that the focal position of the electrons on the target deviates from the focal position on the target during the normal operation. Thus, even when excessive electron emission occurs from the cathode electrode due to the discharge between the cathode electrode and the adjustment electrode, it is possible to avoid damage to the target due to excessive incidence of the electrons on the focal position of the electrons during the normal operation, that is, on a target region to be an X-ray generation region during the normal operation. Therefore, in the X-ray generator, even when the discharge occurs between the cathode electrode and the adjustment electrode, appropriate generation of the X-ray can be continued.

In the X-ray generator, a drive power in the deflection switching unit may be adjusted at least one of during the normal operation and during the discharge detection. In this case, it is possible to precisely switch the deflection state of the electrons directed toward the target.

The deflection switching unit may cause the electrons traveling from the cathode electrode toward the target to travel straight during the normal operation, and may deflect the electrons traveling from the cathode electrode toward the target during the discharge detection. In this case, it is easy to grasp the focal position of the electrons on the target during the normal operation, that is, the focal position of the X-ray during the normal operation, and it is easy to adjust an optical axis as the X-ray generator.

The deflection switching unit may deflect the electrons traveling from the cathode electrode toward the target during the normal operation, and may cause the electrons traveling from the cathode electrode toward the target to travel straight during the discharge detection. In this case, it is easy to grasp the focal position of the electrons on the target during the discharge detection, and it is easy to grasp a target region that is undesirable as the focal position of the electrons on the target during the normal operation.

The deflection switching unit may switch the deflection state of the electrons such that the focal position of the electrons on the target during the discharge detection deviates from the focal position of the electrons on the target during the normal operation at a distance equal to or longer than a focal dimension of the electrons. Thus, it is possible to more reliably avoid the damage of the target due to excessive incidence of the electrons on the focal position of the electrons during the normal operation, that is, on the target region to be the X-ray generation region during the normal operation.

The deflection switching unit may include a deflection coil. In this case, it is possible to suitably switch the deflection state of the electrons directed toward the target.

The deflection switching unit may include a deflection electrode. In this case, it is possible to suitably switch the deflection state of the electrons directed toward the target.

DETAILED DESCRIPTION

Hereinafter, a preferred embodiment of an X-ray generator according to one aspect of the present disclosure will be described in detail with reference to the drawings.

Figure 1:
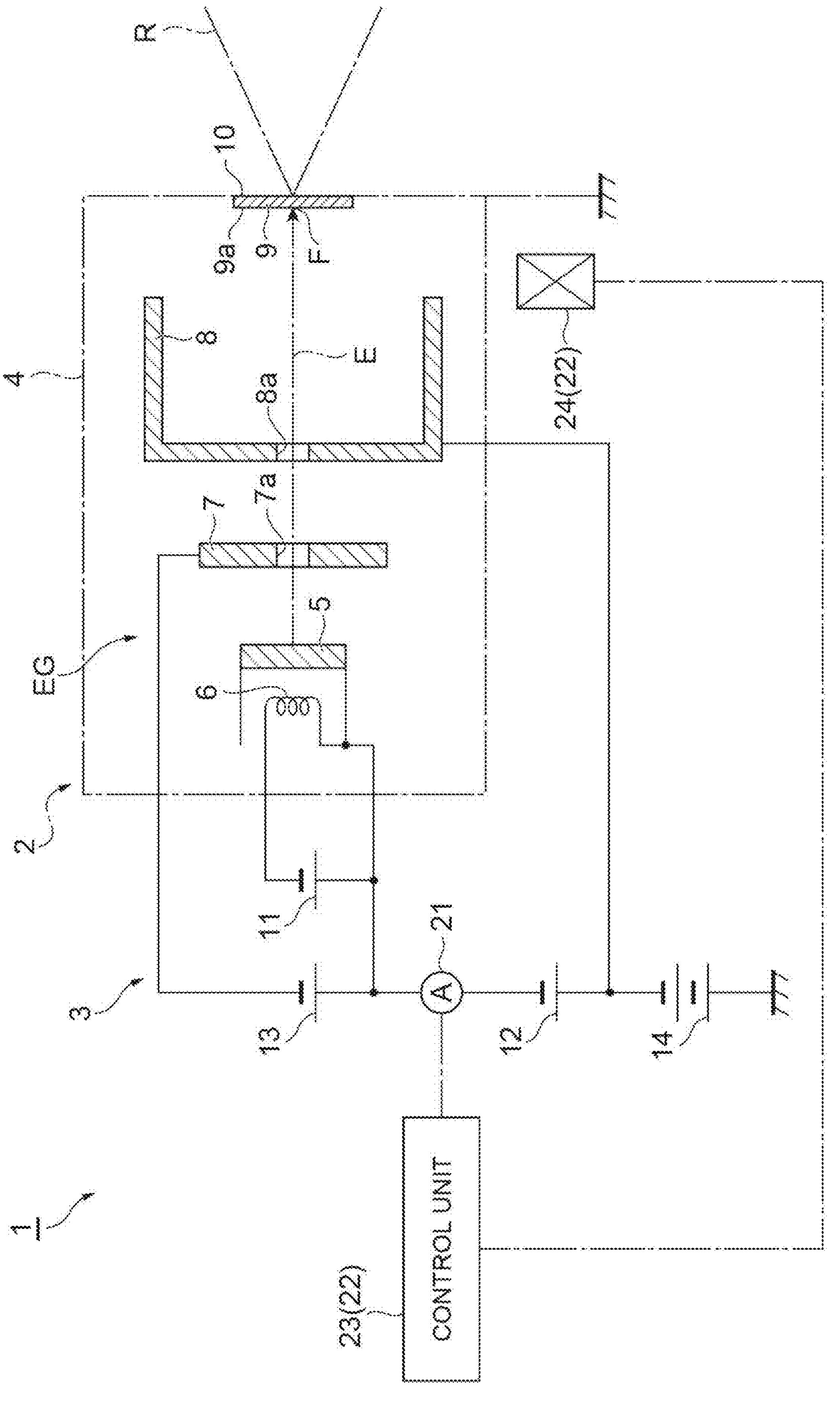
FIG. 1 is a schematic view illustrating a configuration of an X-ray generator according to an embodiment of the present disclosure.

FIG. 1 is a schematic view illustrating a configuration of the X-ray generator according to an embodiment of the present disclosure. As illustrated in the figure, an X-ray generator 1 includes an X-ray tube 2 and a drive circuit 3. The X-ray tube 2 is a transmission type X-ray tube, and is configured to include a cathode electrode 5, a heater 6, an adjustment electrode 7, a control electrode 8, and a target 9 in a vacuum housing 4. The cathode electrode 5, the heater 6, the adjustment electrode 7, and the control electrode 8 constitute an electron gun EG.

The vacuum housing 4 is formed in a hollow tubular shape by, for example, airtightly joining a head portion formed of a metal material and a valve portion formed of an insulating material. Examples of the metal material constituting the head portion include stainless steel, a nickel alloy, copper, a copper alloy, and an iron alloy. Examples of the insulating material constituting the valve portion include glass and ceramic. A window member 10 is provided at a tip end of the head portion. The window member 10 is formed in a plate shape with a tube axis as a center line using, for example, an X-ray transmissive material such as beryllium, aluminum, or diamond.

The cathode electrode 5 is an electrode that emits electrons E. The cathode electrode 5 emits electrons E by being heated by the heater 6 in an energized state. The heater 6 is a part that heats the cathode electrode 5. The heater 6 includes a filament that generates heat by energization. The electrons E emitted from the cathode electrode 5 pass through an electron passing hole 7*a* of the adjustment electrode 7 and an electron passing hole 8*a* of the control electrode 8, and travel toward the target 9.

The adjustment electrode 7 is a first grid electrode that adjusts an amount of electrons emitted from the cathode electrode 5. The amount of electrons emitted from the cathode electrode 5 refers to an amount of electrons E that pass through the adjustment electrode 7 and travel to the target 9 among the electrons E emitted from the cathode electrode 5 by heating of the heater 6. The adjustment electrode 7 controls the amount of electrons emitted from the cathode electrode 5 based on a voltage applied to the adjustment electrode 7. The adjustment electrode 7 has, for example, the electron passing hole 7*a* having a circular section. The electron passing hole 7*a* allows the electrons E emitted from the cathode electrode 5 to pass to the control electrode 8 side.

The control electrode 8 is a second grid electrode that controls a trajectory of the electrons E from the cathode electrode 5 by forming an electrostatic lens. The control electrode 8 also functions as an extraction electrode that forms an electric field for extracting electrons from the cathode electrode 5. The control electrode 8 focuses the electrons E emitted from the cathode electrode 5 and passing through the adjustment electrode 7, and focuses the electrons E as an electron beam on the target 9. The control electrode 8 has, for example, the electron passing hole 8*a* having a circular section. The electron passing hole 8*a* is disposed coaxially with the electron passing hole 7*a* of the adjustment electrode 7, and allows the electrons E passing through the electron passing hole 7*a* to pass to the target 9 side.

The target 9 is a part that generates an X-ray R by incidence of the electrons E. The target 9 is provided on an inner (a vacuum side) surface of the window member 10 on the tube axis of the vacuum housing 4. The target 9 is, for example, a film body formed on the inner surface of the window member 10. Examples of a constituent material of the target 9 include tungsten, molybdenum, and copper. The target 9 is electrically connected to a head of the vacuum housing 4. A potential of the target 9 is, for example, a ground potential.

As illustrated in FIG. 1, the drive circuit 3 is configured to include a heater power supply 11, a cathode electrode power supply 12, an adjustment electrode power supply 13, and a control electrode power supply 14. The heater power supply 11 is electrically connected to the heater 6 and supplies a voltage to the heater 6. The cathode electrode power supply 12 is electrically connected to the cathode electrode 5 and supplies the voltage to the cathode electrode 5. The adjustment electrode power supply 13 is electrically connected to the adjustment electrode 7 and supplies the voltage to the adjustment electrode 7. The control electrode power supply 14 is electrically connected to the control electrode 8 and supplies the voltage to the control electrode 8.

In the X-ray generator 1 having the above configuration, during normal operation in which the X-ray R is output from the target 9, for example, a negative high voltage of about −100 kV is applied to the electron gun EG, for example, with the potential of the target 9 as a reference (ground potential). The X-ray tube 2 of the present embodiment is a so-called triode X-ray tube having, in addition to the cathode electrode 5 and the target 9 described above, electrodes such as the adjustment electrode 7 and control electrode 8 that control the electrons E emitted from the cathode electrode 5 and directed toward the target 9, and these electrodes 5, 7, and 8 control parameters of the electrons E emitted from the cathode electrode 5 and the X-ray R generated from the target 9.

In the X-ray generator 1, the electrons E are emitted from the cathode electrode 5 by application of heat from the heater 6. The amount of electrons emitted from the cathode electrode 5 is controlled by a potential difference between the cathode electrode 5 and the adjustment electrode 7. An initial velocity of the electrons E is controlled by a potential difference between the cathode electrode 5 and the control electrode 8. The electrons E that have reached the control electrode 8 are accelerated by a potential difference between the control electrode 8 and the target 9 (here, the ground potential), and collide with the target 9.

The electrostatic lens that controls the trajectory of the electrons E is formed by a potential of the control electrode 8. A dimension of a focal point F (A focal dimension) of the electrons E on the target 9 is controlled by the initial velocity of the electrons E and an action of the electrostatic lens. The focal dimension of the electrons E on the target 9 refers to a size of an incident region of the electrons E on an electron incident surface 9*a* of the target 9. During the normal operation, the potential difference between the cathode electrode 5 and the control electrode 8 is controlled to minimize the focal dimension of the electrons E on the target 9. The X-ray R generated on the target 9 by collision of the electrons E is emitted to an outside of the X-ray tube 2 through the window member 10. Luminance (A tube current value) of the X-ray R is controlled by a potential of the adjustment electrode 7. Energy (An acceleration voltage value) of the X-ray R is controlled by the potential of the control electrode 8.

In the X-ray generator 1 described above, discharge can occur inside the X-ray tube 2. In the X-ray generator 1 in which the adjustment electrode 7 for adjusting the amount of electrons emitted from the cathode electrode 5 is disposed in the X-ray tube 2, for example, it is conceivable that a part of a material constituting the cathode electrode 5 flies from the cathode electrode 5 heated by the heater 6 and adheres to the adjustment electrode 7. Further, not limited to the material constituting the cathode electrode 5, various foreign matters such as a material constituting the heater 6 may adhere to the adjustment electrode 7. When a deposit is deposited on the adjustment electrode 7, a distance between the cathode electrode 5 and the adjustment electrode 7 is shortened, and inherent withstand voltage characteristics are deteriorated, and the discharge is likely to occur. When the discharge occurs between the cathode electrode 5 and the adjustment electrode 7, since the cathode electrode 5 and the adjustment electrode 7 have the same potential during the discharge, control of the amount of electrons emitted from the cathode electrode 5, which has been performed by the potential difference between the cathode electrode 5 and the adjustment electrode 7, cannot be temporarily performed. In this case, since the electrons from the cathode electrode 5 are emitted without control according to a potential difference between the cathode electrode 5 and the target 9, excessive electron emission may occur from the cathode electrode 5. When excessive electron emission is performed from the cathode electrode 5, excessive electrons E are incident on the target 9, and the target 9 may be damaged.

Therefore, in the X-ray generator 1, the drive circuit 3 is provided with a discharge detection unit 21 that detects discharge between the cathode electrode 5 and the adjustment electrode 7, and a deflection switching unit 22 that switches a deflection state of the electrons E directed toward the target 9 so that a focal position F1 of the electrons E on the target 9 during discharge detection deviates from a focal position F0 of the electrons E on the target 9 during the normal operation. The focal position of the electrons E on the target 9 is an incident position of the electrons E on the electron incident surface 9*a* of the target 9, in other words, a target region to be an X-ray generation region.

The discharge detection unit 21 includes, for example, a current transformer or a resistor having a relatively small electric resistance value. The discharge detection unit 21 monitors a current flowing through the cathode electrode 5, and when the current exceeds a predetermined threshold, the discharge detection unit 21 detects that the discharge has occurred between the cathode electrode 5 and the adjustment electrode 7, and outputs a signal (detection signal) indicating a detection result to a control unit 23 described later. Note that a connection position of the discharge detection unit 21 may be any position at which a current during discharge flows from the cathode electrode 5, and is not limited to an example of FIG. 1. In the example of FIG. 1, the discharge detection unit 21 is connected between the cathode electrode 5 and the cathode electrode power supply 12 (on a positive electrode terminal side of the cathode electrode power supply 12), but the discharge detection unit 21 may be connected between the cathode electrode power supply 12 and the control electrode power supply 14 (on a negative electrode terminal side of the cathode electrode power supply 12). The connection position of the discharge detection unit 21 may be between the control electrode power supply 14 and a reference potential (the ground potential) (on a negative electrode terminal side of the control electrode power supply 14).

The deflection switching unit 22 includes the control unit 23 and a deflection coil 24. The control unit 23 is configured to physically include, for example, a processor such as a CPU and a storage medium such as a RAM and a ROM. The control unit 34 may be a smartphone or a tablet terminal integrally provided with a display unit and an input unit, and may include a microcomputer, a field-programmable gate array (FPGA), or the like.

The control unit 23 is a part that functionally controls operation of the deflection coil 24. The control unit 23 includes a current source or a voltage source electrically connected to the deflection coil 24. Based on the detection signal from the discharge detection unit 21, the control unit 23 adjusts the drive power, including supplying or stopping supply of a driving current or voltage to the deflection coil 24. The deflection coil 24 is a part that receives the supply of the driving current or voltage and deflects the trajectory of the electrons E. As illustrated in FIG. 1, the deflection coil 24 is disposed near the X-ray tube 2. An arrangement position of the deflection coil 24 in an orbital axis direction of the electrons E is, for example, a position between the control electrode 8 and the target 9.

Figure 2A:
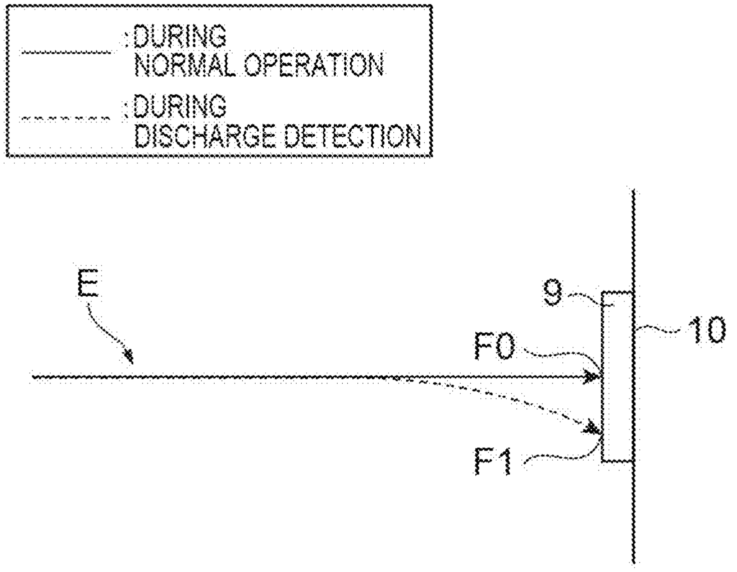
FIG. 2A is a view illustrating an example of operation of a deflection switching unit during normal operation and discharge detection.

As illustrated in FIG. 2A, the deflection switching unit 22 may have an aspect in which the electrons E traveling from the cathode electrode 5 toward the target 9 are caused to travel straight during the normal operation, and the electrons E traveling from the cathode electrode 5 toward the target 9 are deflected during the discharge detection. When the focal position F0 of the electrons E on the target 9 is located on a predetermined axis (for example, the tube axis), for example, during the normal operation, the deflection switching unit 22 performs control so that the focal position F1 of the electrons E is a position deviated in an arbitrary direction in a plane of the target 9 from the aforementioned predetermined axis during the discharge detection.

When there is no element that deflects the electrons E traveling from the cathode electrode 5 toward the target 9 during the normal operation, the control unit 23 does not supply the driving current or voltage to the deflection coil 24 during the normal operation, and supplies the driving current or voltage to the deflection coil 24 over a certain period when receiving the detection signal from the discharge detection unit 21. When there is an element that deflects the electrons E directed toward the target 9 during the normal operation (for example, when a magnetic field or the like by a permanent magnet or the like is always present), the control unit 23 supplies the driving current or voltage to the deflection coil 24 during the normal operation, and does not supply the driving current or voltage to the deflection coil 24 over a certain period when receiving the detection signal from the discharge detection unit 21.

Figure 2B:
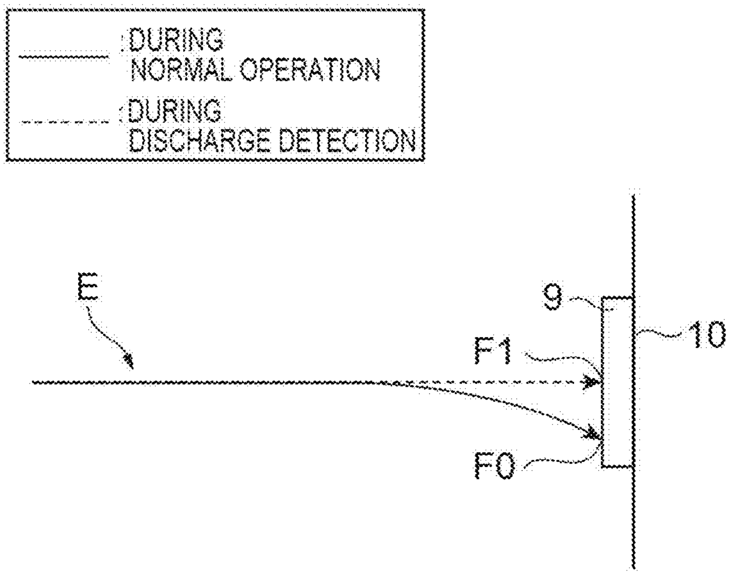
FIG. 2B is a view illustrating another example of the operation of the deflection switching unit during the normal operation and during the discharge detection.

As illustrated in FIG. 2B, the deflection switching unit 22 may have an aspect in which the electrons E traveling from the cathode electrode 5 toward the target 9 are deflected during the normal operation, and the electrons E traveling from the cathode electrode 5 toward the target 9 are caused to travel straight during the discharge detection. In this case, the deflection switching unit 22 performs control so that the focal position F0 of the electrons E on the target 9 is located at a position deviated in an arbitrary direction in a plane of the target 9 from the aforementioned predetermined axis (for example, the tube axis), for example, during the normal operation, and the focal position F1 of the electrons E is located on the aforementioned predetermined axis in the plane of the target 9 during the discharge detection.

The control unit 23 supplies the driving current or voltage to the deflection coil 24 during the normal operation, and stops the supply of the driving current or voltage to the deflection coil 24 over a certain period when receiving the detection signal from the discharge detection unit 21. When there is no element that deflects the electrons E traveling from the cathode electrode 5 toward the target 9 during the normal operation, the control unit 23 does not supply the driving current or voltage to the deflection coil 24 during the normal operation, and does not supply the driving current or voltage to the deflection coil 24 over a certain period when receiving the detection signal from the discharge detection unit 21.

Figure 3:
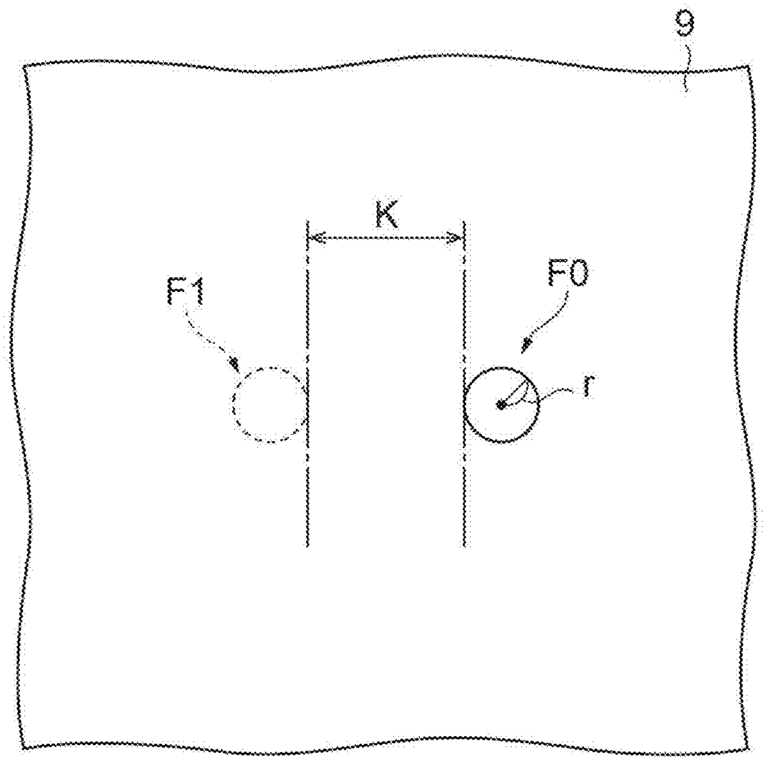
FIG. 3 is a schematic view illustrating a relationship between a focal position of electrons during the normal operation and the focal position of the electrons after deflection during the discharge detection.

In any aspect of FIGS. 2A and 2B, the deflection switching unit 22 preferably switches the deflection state of the electrons E so that the focal position F1 of the electron E during the discharge detection deviates from the focal position F0 of the electrons E during the normal operation by a distance equal to or longer than the focal dimension of the electrons E. The focal dimension of the electrons E is the size of the incident region of the electrons E on the electron incident surface 9*a* of the target 9, in other words, the size of the target region to be the X-ray generation region. For example, as illustrated in FIG. 3, when the focal dimension (here, a focal radius) of the electrons E is r, and a shortest distance between the electrons E during the normal operation and the electrons E after deflection during the discharge detection is K, it is preferable that $K \geq r$. From the viewpoint of more reliably separating the electrons E during the normal operation and the electrons E after deflection during the discharge detection, it is more preferable that $K \geq 10 \times r$.

The focal position F1 of the electrons E after deflection during the discharge detection may be located in a region of the target 9 or may be located outside the region of the target 9 as long as the focal position F1 deviates from the focal position F0 of the electrons E during the normal operation. When the focal position F1 of the electrons E after deflection during the discharge detection is located outside the region of the target 9, a member having absorbability for the electrons E, a member having low X-ray generation efficiency by the electrons E, or the like may be disposed inside the vacuum housing 4 so as to correspond to the focal position F1.

As described above, in the X-ray generator 1, when the discharge between the cathode electrode 5 and the adjustment electrode 7 is detected, the deflection state of the electrons E directed toward the target 9 is switched to control the trajectory of the electrons E so that the focal position F1 of the electrons E on the target 9 deviates from the focal position F0 on the target 9 during the normal operation. Thus, even when excessive electron emission occurs from the cathode electrode 5 due to the discharge between the cathode electrode 5 and the adjustment electrode 7, it is possible to avoid damage to the target due to excessive incidence of the electrons E on the focal position F0 of the electrons E during the normal operation, that is, on the target region to be the X-ray generation region during the normal operation. Therefore, in the X-ray generator 1, even when the discharge occurs between the cathode electrode 5 and the adjustment electrode 7, appropriate generation of the X-ray R can be continued.

The present embodiment includes an aspect in which the drive power in the deflection switching unit 22 is adjusted at least one of during the normal operation and during the discharge detection. In this case, it is possible to precisely switch the deflection state of the electrons E directed toward the target 9. When the deflection switching unit 22 is driven during the discharge detection, the trajectory of the electron E can be quickly returned to the trajectory during the normal operation only by stopping supply of the drive power after the discharge is terminated. When the deflection switching unit 22 is driven during the normal operation, the trajectory of the electron E can be quickly changed to the trajectory during the discharge detection only by stopping the supply of the drive power when the discharge occurs.

The present embodiment includes an aspect in which the electrons E traveling from the cathode electrode 5 toward the target 9 are caused to travel straight during the normal operation, and the electrons E traveling from the cathode electrode 5 toward the target 9 are deflected during the discharge detection. According to such an aspect, it is easy to grasp the focal position F0 of the electrons E on the target 9 during the normal operation, that is, the focal position of the X-ray during the normal operation, and it is easy to adjust an optical axis as the X-ray generator 1.

In addition, the present embodiment includes an aspect in which the electrons E traveling from the cathode electrode 5 toward the target 9 are deflected during the normal operation, and the electrons E traveling from the cathode electrode 5 toward the target 9 are caused to travel straight during the discharge detection. According to such an aspect, it is easy to grasp the focal position F1 of the electrons E on the target 9 during the discharge detection, and it is easy to grasp a target region that is undesirable as the focal position F0 of the electrons E on the target 9 during the normal operation.

In the present embodiment, the deflection switching unit 22 includes the deflection coil 24. By configuring the deflection switching unit 22 with the deflection coil 24, it is possible to suitably switch the deflection state of the electrons E directed toward the target 9.

Either the current source or the voltage source may be used to drive the deflection coil 24. When the current source is used to drive the deflection coil 24, by causing a large current to flow through the deflection coil 24, the deflection state of the electrons E can be switched in a shorter time than when the voltage source is used. When the discharge occurs between the cathode electrode 5 and the adjustment electrode 7, the focal position F1 of the electrons E quickly deviates from the focal position F0 during the normal operation, so that the focal position F0 of the electrons E during the normal operation on the target 9 can be more reliably protected from excessive concentration of the electrons E. On the other hand, when the voltage source is used to drive the deflection coil 24, the current flowing through the cathode electrode 5 when the deflection state of the electrons E is switched can be stabilized in a short time. Therefore, after the discharge is terminated, the X-ray generator 1 can be quickly returned to the normal operation.

Figure 4:
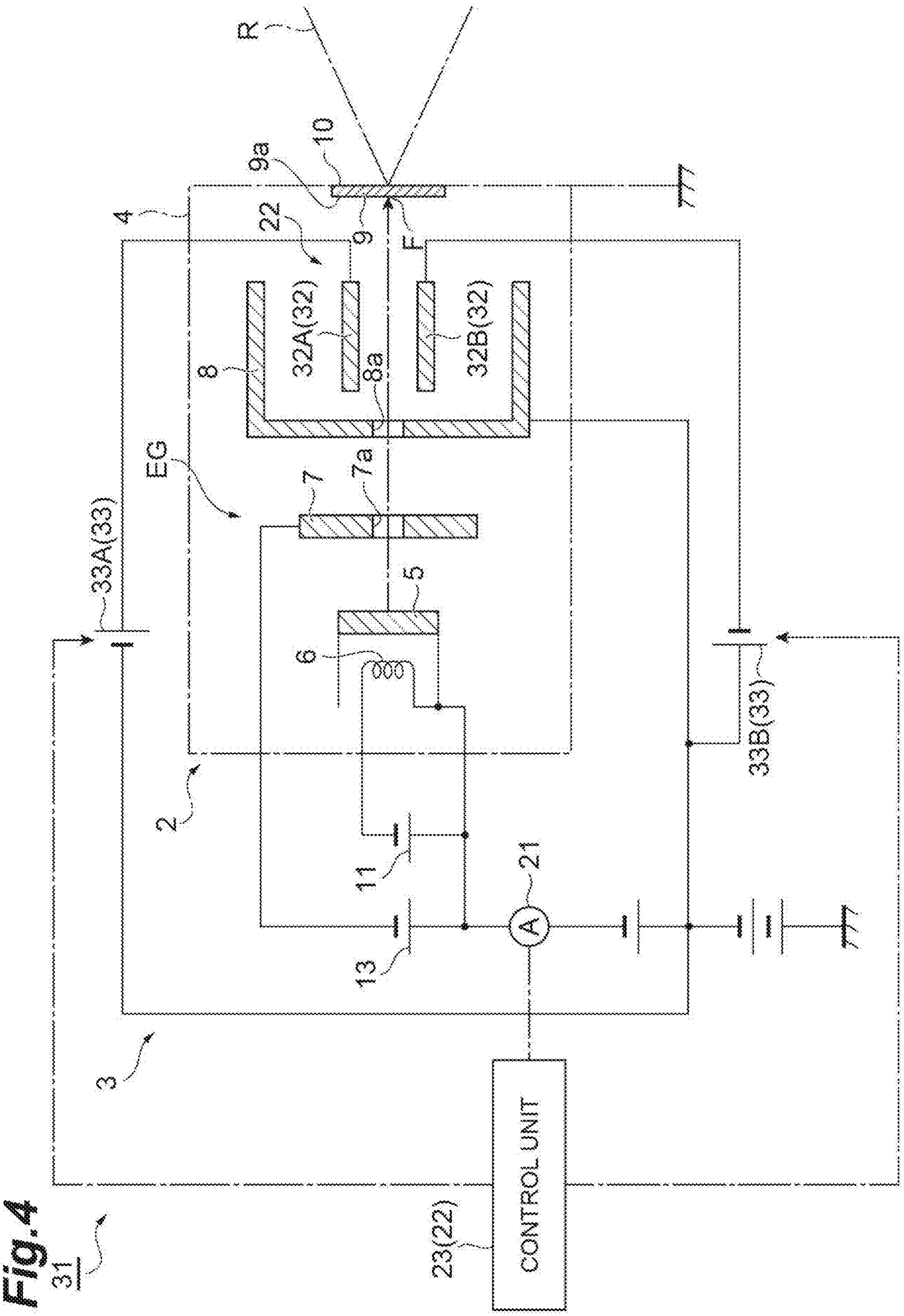
FIG. 4 is a schematic view illustrating a configuration of the X-ray generator according to a modification.

FIG. 4 is a schematic view illustrating a configuration of the X-ray generator according to a modification. As illustrated in the figure, the X-ray generator 31 according to the modification is different from the X-ray generator 1 in which the deflection switching unit 22 is configured to include the deflection coil 24 in that the deflection switching unit 22 is configured to include a deflection electrode 32. Specifically, in the X-ray generator 31, a pair of deflection electrodes 32A and 32B are provided to sandwich an orbital axis of the electrons E at a rear stage (on the target 9 side) of the electron passing hole 8*a* of the control electrode 8. Here, both the deflection electrodes 32A and 32B are plate-like electrodes. In addition, the drive circuit 3 is provided with a deflection power supply 33 that supplies the voltage to the deflection electrode 32. In an example of FIG. 4, the drive circuit 3 is provided with a pair of deflection power supplies 33A and 33B that respectively supply voltages to the deflection electrodes 32A and 32B.

Figure 5A:
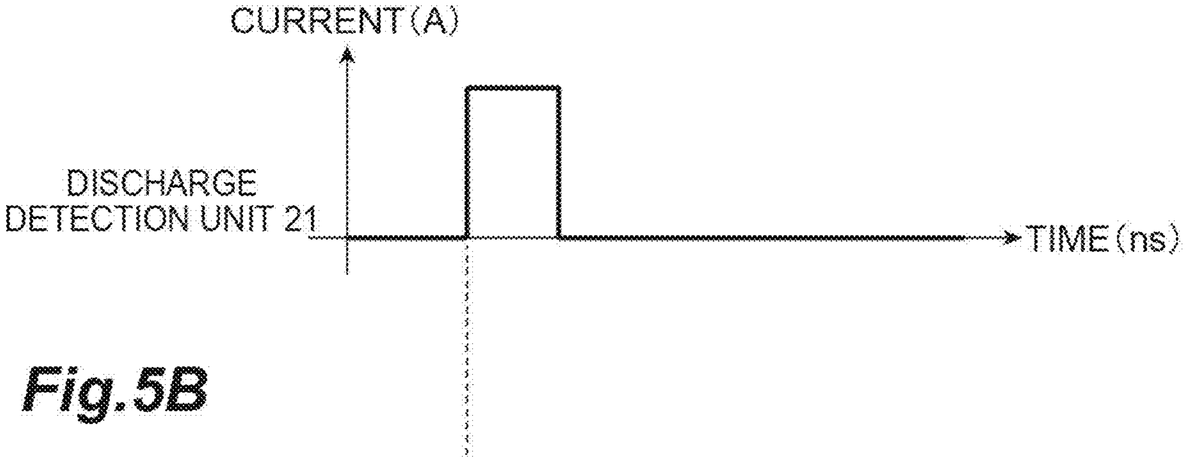
FIG. 5A is a view illustrating the operation of the deflection switching unit in the X-ray generator illustrated in FIG. 4.
Figure 5B:
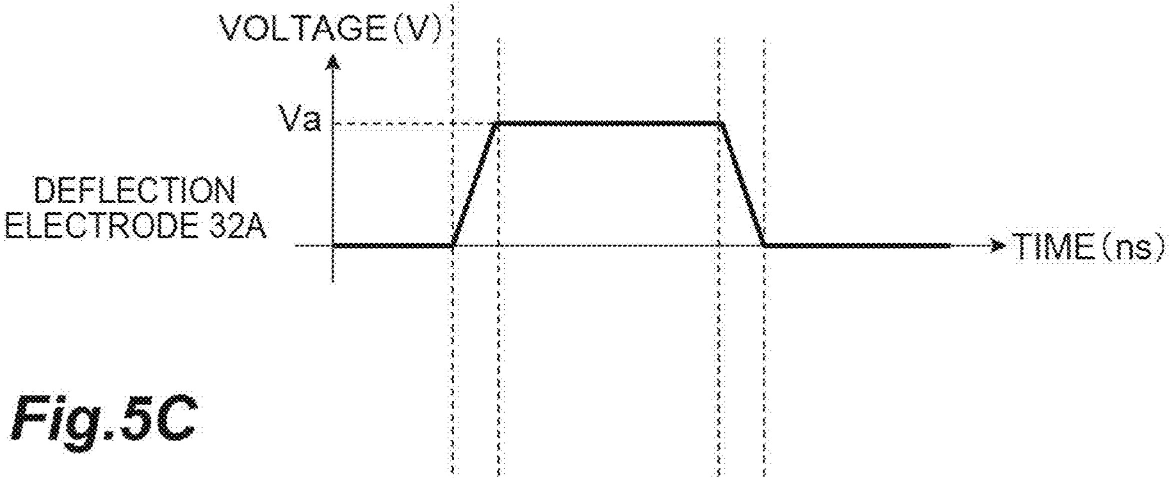
FIG. 5B is a view illustrating the operation of the deflection switching unit in the X-ray generator illustrated in FIG. 4.
Figure 5C:
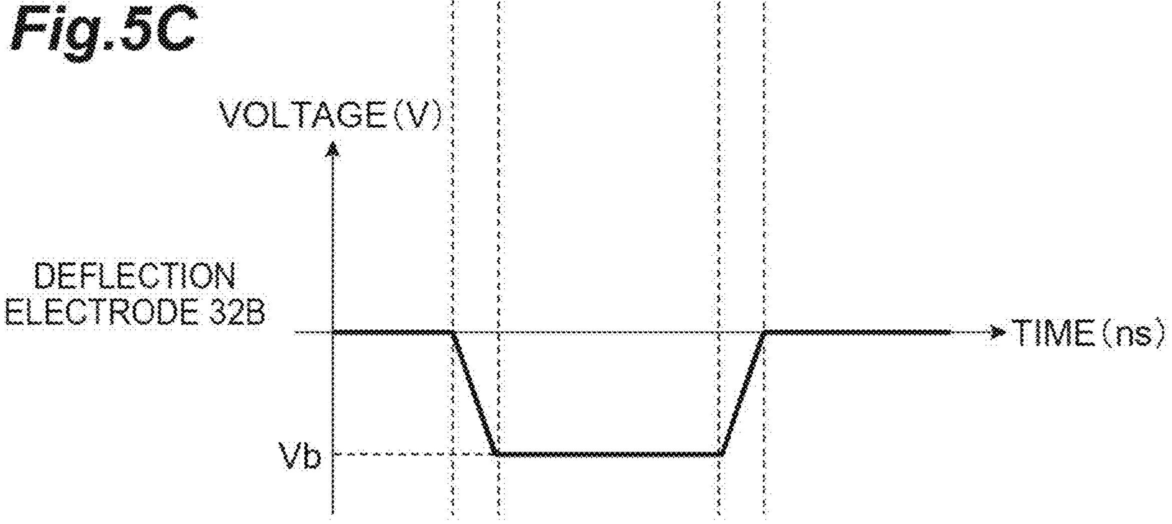
FIG. 5C is a view illustrating the operation of the deflection switching unit in the X-ray generator illustrated in FIG. 4.

In the X-ray generator 31, as illustrated in FIG. 5A, when the discharge detection unit 21 detects that the discharge occurs between the cathode electrode 5 and the adjustment electrode 7, the detection signal is output from the discharge detection unit 21 to the control unit 23. The control unit 23 that has received the detection signal drives the deflection power supplies 33A and 33B to apply a positive voltage Va to the deflection electrode 32A and a negative voltage Vb to the deflection electrode 32B as illustrated in FIGS. 5B and 5C. The deflection electrodes 32A and 32B generate a deflection electric field between the deflection electrodes 32A and 32B by voltage application from the deflection power supplies 33A and 33B, and deflect the electrons E traveling from the cathode electrode 5 toward the target 9.

As in the X-ray generator 1, the aspect of the deflection of the electrons E by the deflection electrodes 32A and 32B may be the aspect in which the electrons E traveling from the cathode electrode 5 toward the target 9 are caused to travel straight during the normal operation, and the electrons E traveling from the cathode electrode 5 toward the target 9 are deflected during the discharge detection, or the aspect in which the electrons E traveling from the cathode electrode 5 toward the target 9 are deflected during the normal operation, and the electrons E traveling from the cathode electrode 5 toward the target 9 are caused to travel straight during the discharge detection (see FIGS. 2A and 2B).

Also in such an X-ray generator 31, as in the above embodiment, when the discharge between the cathode electrode 5 and the adjustment electrode 7 is detected, the deflection state of the electrons E directed toward the target 9 is switched to control the trajectory of the electrons E so that the focal position F1 of the electrons E on the target 9 deviates from the focal position F0 on the target 9 during the normal operation. Thus, even when excessive electron emission occurs from the cathode electrode 5 due to the discharge between the cathode electrode 5 and the adjustment electrode 7, it is possible to avoid the damage to the target due to excessive incidence of the electrons E on the focal position F0 of the electrons E during the normal operation on the target 9, that is, on the target region to be the X-ray generation region during the normal operation. Therefore, appropriate generation of the X-ray R can be continued.

In the present embodiment, the deflection switching unit 22 includes the deflection electrodes 32A and 32B. By configuring the deflection switching unit 22 with the deflection electrodes 32A and 32B, it is possible to suitably switch the deflection state of the electrons E directed toward the target 9. Note that the deflection electrode 32 does not necessarily include the pair of deflection electrodes 32A and 32B, and may include only one of the deflection electrodes 32A and 32B. In this case, since one of the deflection power supplies 33A and 33B can also be omitted, configuration of the drive circuit 3 can be simplified.

The present disclosure is not limited to the above embodiment. For example, in the above embodiment, the transmission type X-ray tube is exemplified as the X-ray tube 2, but the X-ray tube 2 may be a reflection type X-ray tube. Further, in the above embodiment, a sealed tube structure in which the vacuum housing 4 is sealed as a vacuum tube is exemplified as the X-ray tube 2, but the X-ray tube 2 may have an open tube structure including an exhaust pump or the like. Further, in the above embodiment, a hot cathode structure including the heater 6 is exemplified as the electron gun EG, but the electron gun EG may have a cold cathode structure. A potential relationship applied to the electron gun EG and the target 9 may be any relationship in which the electrons E are directed toward the target at the time of X-ray generation, and an electrode other than the target 9 may be the reference potential (ground potential).

A position of the discharge detection unit 21 is not limited to between the cathode electrode 5 and the cathode electrode power supply 12, and may be provided, for example, between the adjustment electrode 7 and a negative electrode terminal of the adjustment electrode power supply 13. In this case, the discharge detection unit 21 detects a current flowing from the adjustment electrode 7 to the negative electrode terminal of the adjustment electrode power supply 13 (a current flowing through the adjustment electrode 7) as the current during discharge. The discharge detection unit 21 may be provided between a positive electrode terminal of the adjustment electrode power supply 13 and the cathode electrode 5. In this case, the discharge detection unit 21 detects a current flowing from the positive electrode terminal of the adjustment electrode power supply 13 to the cathode electrode 5 as the current during discharge. The discharge detection unit 21 may be provided between the target 9 and the ground potential. In this case, the discharge detection unit 21 detects a current flowing through the target 9 as the current during discharge.

In the above embodiment, only the deflection switching unit 22 used for handling during the discharge detection is provided, but a deflection unit that changes the incident position of the electrons E during the normal operation (that is, changes the focal position of the X-ray R during the normal operation) may be provided separately from the deflection switching unit 22. Further, in the above embodiment, the deflection switching unit 22 is driven either during the normal operation or during the discharge detection, however, by changing a degree of the deflection between during the normal operation and during the discharge detection, the deflection state of the electrons E directed toward the target 9 may be switched while constantly driving the deflection switching unit 22.

What is claimed is:

1. An X-ray generator comprising:

a cathode electrode configured to emit electrons;

an adjustment electrode configured to adjust an amount of electrons emitted from the cathode electrode;

a control electrode configured to control a trajectory of the electrons from the cathode electrode;

a target configured to generate an X-ray by incidence of the electrons;

a discharge detection unit configured to detect discharge between the cathode electrode and the adjustment electrode; and a deflection switching unit configured to switch a deflection state of the electrons directed toward the target such that a focal position of the electrons on the target during discharge detection deviates from the focal position of the electrons on the target during normal operation.

2. The X-ray generator according to claim 1, wherein a drive power in the deflection switching unit is adjusted at least one of during the normal operation and during the discharge detection.

3. The X-ray generator according to claim 1, wherein the deflection switching unit causes the electrons traveling from the cathode electrode toward the target to travel straight during the normal operation, and deflects the electrons traveling from the cathode electrode toward the target during the discharge detection.

4. The X-ray generator according to claim 1, wherein the deflection switching unit deflects the electrons traveling from the cathode electrode toward the target during the normal operation, and causes the electrons traveling from the cathode electrode toward the target to travel straight during the discharge detection.

5. The X-ray generator according to claim 1, wherein the deflection switching unit switches the deflection state of the electrons such that the focal position of the electrons on the target during the discharge detection deviates from the focal position of the electrons on the target during the normal operation at a distance equal to or longer than a focal dimension of the electrons.

6. The X-ray generator according to claim 1, wherein the deflection switching unit includes a deflection coil.

7. The X-ray generator according to claim 1, wherein the deflection switching unit includes a deflection electrode.

* * * * *